UNITED STATES PATENT OFFICE 2,498,446

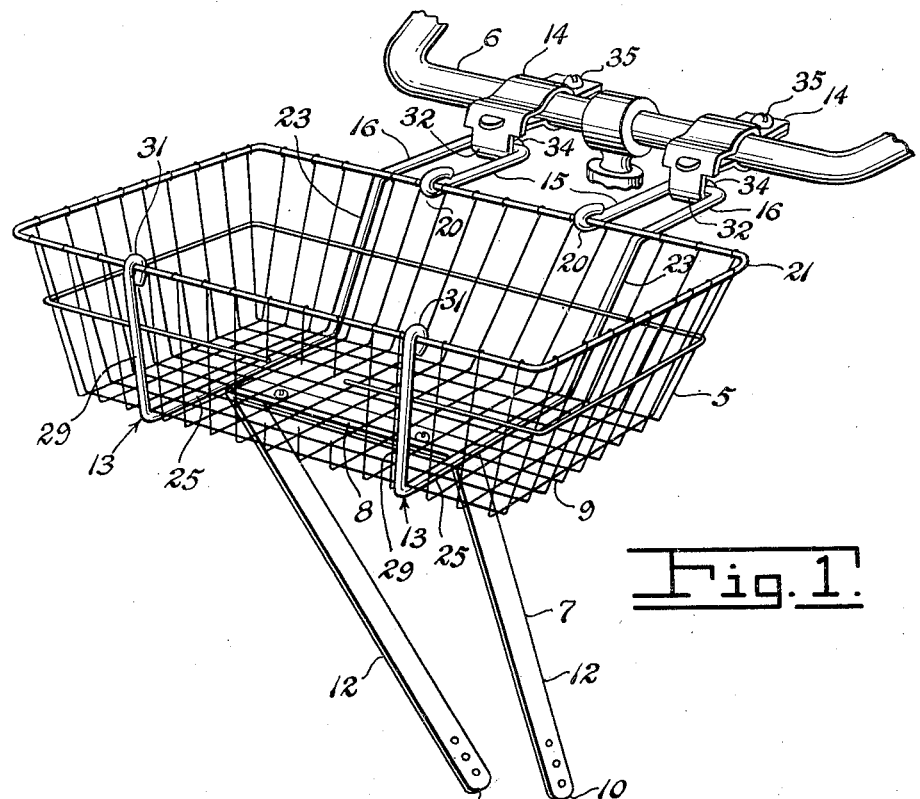
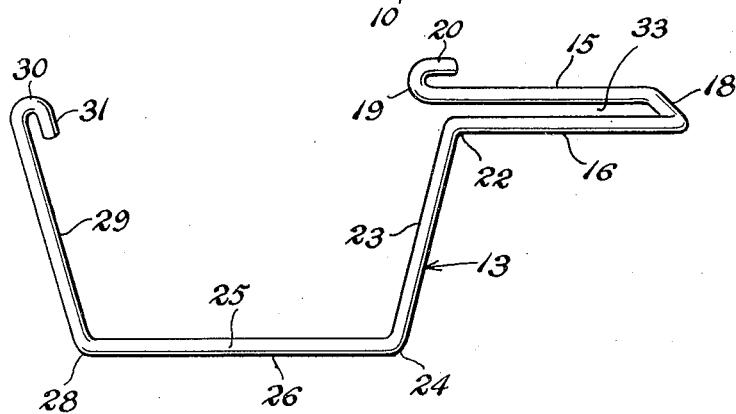
INVENTOR.
EWALD F. PAWSAT
BY Zugelter & Zugelter
Attys.

BASKET MOUNTING BRACKET

Ewald F. Pawsat, Maysville, Ky.

Application April 29, 1948, Serial No. 23,963

2 Claims. (Cl. 224—36)

This invention relates to improved means for mounting a basket upon a bicycle and the like.

One of the objects of the invention is to provide a bracket upon which a completely assembled wire basket of substantially rectangular form having a circumferential wire rim may be mounted upon a bicycle and the like.

A further object of the invention is to provide a basket mounting bracket which is highly serviceable and extremely rigid in construction.

Another object of the invention is to provide a bracket of the class described which is of such construction that a worn or mutilated basket may be replaced thereupon, thus effecting a substantial economy to the bicycle owner.

Still another object is the attainment of the foregoing advantages at a minimum of expense in the performance of the manufacturing and assembling operations.

These and other objects and advantages are attained by the means described herein and illustrated upon the accompanying drawing in which:

Fig. 1 is a perspective view of a basket mounted upon the handle bar of a bicycle in accordance with the present invention.

Fig. 2 is a perspective view of a basket mounting bracket embodying the invention.

Bicycle baskets or luggage carriers formerly were constructed with the mounting means forming an integral part of the basket or carrier, a practice which involved complicated manufacturing and assembling operations and added to the cost of fabricating the units.

Another disadvantage in the past was the fact that when a basket or carrier became worn out or otherwise rendered unserviceable, it was necessary to replace the entire unit, including the supporting or mounting means.

The instant invention obviates the necessity of replacing an entire unit when the basket requires replacement, since it is a relatively simple matter to remove the worn basket from the brackets and install a new one, an operation requiring no skill and only the use of one or two simple tools. Assembly work at the factory in fabricating the basket and bracket unit is also simplified, as will presently be shown.

Referring to the drawing, a rectangular basket 5 of conventional wire construction is shown mounted upon the handle bar 6 of a bicycle. A brace 7 is adapted to support the basket in substantially horizontal position, the upper horizontal portion 8 of said brace being suitably secured to the bottom 9 of the basket, while the apertured lower free ends 10 of the brace legs 12 are attached to the front spindle hub of the bicycle, or to any other part of the steering fork.

As shown in Fig. 1, the basket is cradled in a pair of brackets 13, said brackets being clamped to the handle bar of a bicycle by means of clamps 14. The brackets 13 are formed from lengths of heavy gage wire, the forming operation being independent of constructing the basket.

The bracket 13, as illustrated in Fig. 2 comprises a pair of substantially parallel, horizontally co-planar arms 15 and 16, spaced apart and joined by a short connector member 18, all of which are integral. The free end 19 of arm 15 is turned upward and over upon itself to form a hook 20 which is adapted to engage the basket rim wire 21 at the side nearest the handle bar 6.

The arm 16, which is substantially longer than arm 15, is bent downwardly at a point co-axial with the radius of hook 20, as indicated at 22, to form the basket rear support member 23. At a point approximating the depth of the basket 5, the arm 16 is then bent outwardly or forwardly as at 24, to form the basket bottom support 25. The cradle portion 26 of the arm 16 is then completed by turning the wire upwardly, as at 28, to form the basket front support member 29. The final operation comprises turning the free end 30 of member 29 inwardly and downwardly to form the hook 31, which is adapted to engage the front portion of the wire rim 21 of the basket 5.

The rear and front support members 23 and 29 of the cradle 26 may be convergent, to conform to the contour of the basket 5.

As illustrated in Fig. 1, the clamp 14 has a depending lug 32, of substantially the same width as the width of the space 33 between the bracket arms 15 and 16. The lug 32 is turned or rolled to grip the bracket connector member 18 in embracing relation, as shown at 34. Since the remainder of the clamp 14 may comprise any standard or conventional type of fastener, no claim is laid to the means of attaching the brackets 13 to the handle bar 6, this being accomplished preferably by means of a screw or bolt 35.

The final step in completing the basket assembly consists of applying a pair of brackets 13 to a completely fabricated basket 5 by engaging the hooks 20 and 31 with the rear and front portions of the wire rim 21, respectively, then closing the hooks by a pressing operation, to secure a firm connection with the basket.

Assembled in this manner the completed basket structure comprises a rigid and serviceable carrier for bicycles and the like. This assembly is superior to other carriers for the reason that if the basket itself becomes worn, mutilated, or otherwise rendered unserviceable, the bracket hooks 20 and 31 may be pried open and the old basket replaced with a new one. This advantage will be appreciated by those skilled in the art, since the savings in replacement are substantial.

As hereinbefore stated, manufacturing operations are greatly simplified with the device of the present invention, since the basket and brackets may be independently fabricated, with resultant savings in labor costs.

It is to be understood that various structural changes and modifications may be made within the scope of the appended claims, without departing from the spirit of the invention.

What is claimed is:

1. In combination with a cycle having a handle bar and a basket support frame extending in front of the handle bar, a basket having a bottom, side walls, a front wall, a rear wall, and a circumferential frame element defining the top opening of the basket, the bottom of the basket being supported on the basket support frame, a pair of clamps attached to the handle bar, each of said clamps having a bracket supporting hook extending forwardly of the handle bar, and a pair of brackets each extending between the basket and one of the hooks, each of said brackets comprising a single length of heavy wire, the wire being bent to provide two U-shaped sections in planes at right angles to each other, one arm of one section having an end integral with an end of one of the arms of the other section, the base of one U-shaped section of each bracket being rotatably held in the hook of one of the clamps, the base of the other U-shaped section of each bracket underlying the bottom of the basket, the end of the free arm of the first U-shaped section of each bracket engaging the rear edge of the frame element of the basket, the end of the free arm of the second U-shaped section of each bracket engaging the forward edge of the frame element of the basket, whereby front and rear edges of the frame element are held in constant spaced relation to the handle bar and the basket is swingable about the hooks.

2. In combination with a cycle having a handle bar and a basket support frame extending in front of the handle bar, a basket having a bottom, side walls, a front wall, a rear wall, and a circumferential frame element defining the top opening of the basket, the bottom of the basket being secured to the basket support frame, a pair of clamps attached to the handle bar, each of said clamps having a bracket supporting hook extending forwardly of the handle bar, and a pair of brackets each extending between the basket and one of the hooks, each of said brackets comprising a single length of heavy wire, the wire being bent to provide two U-shaped sections in planes at right angles to each other, one arm of one section having an end integral with an end of one of the arms of the other section, the base of one U-shaped section of each bracket being rotatably held in the hook of one of the clamps, the base of the other U-shaped section of each bracket underlying the bottom of the basket, the end of the free arm of the first U-shaped section of each bracket engaging the rear edge of the frame element of the basket, the end of the free arm of the second U-shaped section of each bracket engaging the forward edge of the frame element of the basket, whereby front and rear edges of the frame element are held in constant spaced relation to the handle bar and the basket is swingable about the hooks and is adapted to pivot about the hooks when the basket support frame rises and falls with respect to the handle bars.

EWALD F. PAWSAT.

REFERENCES CITED

The following references are of record in the file of this patent:

UNITED STATES PATENTS

| Number | Name | Date |
|---|---|---|
| 792,219 | Johnson | June 13, 1905 |
| 1,908,535 | Pawsat | May 9, 1933 |
| 2,179,844 | Erlanger et al. | Nov. 14, 1939 |
| 2,209,846 | Pawsat | July 30, 1940 |
| 2,253,649 | Price | Aug. 26, 1941 |